(12) United States Patent
Zhang et al.

(10) Patent No.: US 11,547,980 B2
(45) Date of Patent: Jan. 10, 2023

(54) KAOLIN-BASED WATER PURIFYING MATERIAL, PREPARATION METHOD AND USE THEREOF

(71) Applicant: Jiangxi Academy of Environmental Sciences, Jiangxi (CN)

(72) Inventors: Meng Zhang, Nanchang (CN); Xiuxiu Zhou, Nanchang (CN); Ping Jin, Nanchang (CN); Bing Feng, Nanchang (CN); Yan Liu, Nanchang (CN); Zugen Liu, Nanchang (CN); Xiaocong Zhong, Nanchang (CN); Xiuguo Lu, Nanchang (CN)

(73) Assignee: Jiangxi Academy of Environmental Sciences, Nanchang (CN)

( * ) Notice: Subject to any disclaimer, the term of this patent is extended or adjusted under 35 U.S.C. 154(b) by 82 days.

(21) Appl. No.: 17/141,928

(22) Filed: Jan. 5, 2021

(65) Prior Publication Data

US 2022/0134305 A1 May 5, 2022

(30) Foreign Application Priority Data

Nov. 2, 2020 (CN) .......................... 202011202007.3

(51) Int. Cl.
*B01J 20/30* (2006.01)
*C02F 1/28* (2006.01)
(Continued)

(52) U.S. Cl.
CPC ........... *B01J 20/3071* (2013.01); *B01J 20/10* (2013.01); *B01J 20/28004* (2013.01);
(Continued)

(58) Field of Classification Search
CPC ................. B01J 20/10; B01J 20/28004; B01J 20/3071; B01J 20/3078; B01J 20/3085; C02F 1/142; C02F 1/281; C02F 1/285; C02F 1/288; C02F 2101/30; C02F 2103/007; Y02W 10/10; Y02W 10/37
See application file for complete search history.

(56) References Cited

PUBLICATIONS

Abstract of Han et al (CN 101125672), published Feb. 20, 2008, provided by Clarivate Analytics, 3 pp.*

* cited by examiner

*Primary Examiner* — Brian A McCaig
(74) *Attorney, Agent, or Firm* — Meunier Carlin & Curfman LLC

(57) ABSTRACT

The present disclosure relates to the technical field of water purifying material, and in particular to a kaolin-based water purifying material, a preparation method and use thereof. The method for preparing a kaolin-based water purifying material provided by the present disclosure includes the following steps: mixing kaolin and a modifier with water, and conducting hydrothermal reaction to obtain a kaolin-based water purifying material; the modifier is an organic or inorganic modifier; the organic modifier is octadecyl trimethyl ammonium chloride (OTAC), and the inorganic modifier is one or more of polyaluminum chloride, $Al_2(SO_4)_3$, $Fe_2(SO_4)_3$, $AlCl_3$ and $FeCl_3$; the kaolin is 200-400 mesh in particle size. The water purifying material of the present disclosure enables efficient algae removal and water purification, and is safe and eco-friendly.

8 Claims, 8 Drawing Sheets

(51) Int. Cl.
*B01J 20/10* (2006.01)
*B01J 20/28* (2006.01)
*C02F 101/30* (2006.01)
*C02F 103/00* (2006.01)

(52) U.S. Cl.
CPC ....... *B01J 20/3078* (2013.01); *B01J 20/3085* (2013.01); *C02F 1/288* (2013.01); *C02F 1/281* (2013.01); *C02F 1/285* (2013.01); *C02F 2101/30* (2013.01); *C02F 2103/007* (2013.01)

KAOLIN-BASED WATER PURIFYING MATERIAL, PREPARATION METHOD AND USE THEREOF

PRIORITY

This application claims priority of Chinese patent application number 202011202007.3 filed on Nov. 2, 2020 the contents of which is fully incorporated herein by reference.

TECHNICAL FIELD

The present disclosure relates to the technical field of water purifying materials, and in particular to a kaolin-based water purifying material, a preparation method and use thereof.

BACKGROUND

With the continuous development of cities and industry and the massive use of agrochemicals and phosphorus-based detergents, unreasonable reclamation and grazing lead to extensive soil erosion and degradation. As a result, there is a substantial increase in nutrient content of surface runoff. In addition, a plurality of untreated municipal sewage and industrial and agricultural wastewater flow into rivers and lakes to enable constant accumulation of nutrient salts such as nitrogen and phosphorus in lakes and rivers, promoting the abnormal blooming of some algae and other aquatic organisms and thereby causing further accelerated development of eutrophication. In a system of intensifying eutrophication, consumed nutrients cannot be consistent with increased nutrients, facilitating massive algal growth and even water bloom. It has been indicated that frequency of occurrence of water bloom events is increasing, the influence thereof is steadily on the increase, and duration thereof becomes longer and longer. Microcystins can be produced from 25-70% of cyanobacterial blooms worldwide; water bodies polluted by cyanobacterial blooms further suffer from more serious secondary disasters and ecological safety risk because toxic cyanobacterial cells release a plurality of different types of microcystins into the water bodies after rupture. Therefore, it is of important significance in controlling the occurrence of cyanobacterial blooms, reducing pollution, and lowering ecological risk.

Currently, chemical algae removal is a commonly used method for controlling cyanobacterial blooms, such as pouring quicklime, copper sulfate, modified alum, modified clay, 2,2-dibromo-3-nitrilopropionamide (DBNPA), etc. Chemical algae removal is undoubtedly an effective and fast-acting approach that is commonly used in the emergency treatment of water bodies but has a certain controlling effect on algae in water bodies in a short time; moreover, chemical algicides tend to have varying degrees of toxic and side effects. Therefore, it is necessary to seek an environmentally friendly water purifying material with efficient algae removal and high eco-safety.

SUMMARY

An objective of the present disclosure is to provide a kaolin-based water purifying material, a preparation method and use thereof. The water purifying material of the present disclosure enables efficient algae removal and water purification, and is safe and eco-friendly.

To achieve the above objective, the present disclosure provides the following technical solutions:

The present disclosure provides a method for preparing a kaolin-based water purifying material, including the following steps: mixing kaolin and a modifier with water, and conducting hydrothermal reaction to obtain a kaolin-based water purifying material;

The modifier is an organic or inorganic modifier; the organic modifier is octadecyl trimethyl ammonium chloride (OTAC), and the inorganic modifier is one or more of polyaluminum chloride (PAC), $Al_2(SO_4)_3$, $Fe_2(SO_4)_3$, $AlCl_3$ and $FeCl_3$;

The kaolin is 200-400 mesh in particle size.

Preferably, the modifier and the kaolin may have a mass ratio of 1:(10-25).

Preferably, the kaolin and the water may have a solid-liquid ratio of 1 g:(2-5) mL.

Preferably, the hydrothermal reaction may be conducted at a temperature of 300-600° C.

Preferably, the hydrothermal reaction may last for 4-8 h.

Preferably, the hydrothermal reaction may be completed, followed by washing and drying products of the hydrothermal reaction successively.

Preferably, when the modifier is an organic modifier, absolute ethanol and water may be used in the washing successively;

When the modifier is an inorganic modifier, the water may be used as washing liquid in the washing.

Preferably, the drying may be conducted under vacuum; the drying may last for 6-8 h.

When the modifier is an organic modifier, the drying may be conducted at a temperature of 75-85° C.

When the modifier is an inorganic modifier, the drying may be conducted at a temperature of 100-110° C.

The present disclosure provides a kaolin-based water purifying material prepared by the preparation method according to the above solutions.

The present disclosure provides use of the kaolin-based water purifying material according to the above solutions in the treatment of wastewater with harmful algal blooms.

The present disclosure provides a method for preparing a kaolin-based water purifying material, including the following steps: mixing kaolin and a modifier with water, and conducting hydrothermal reaction to obtain a kaolin-based water purifying material; the modifier is an organic or inorganic modifier; the organic modifier is OTAC, and the inorganic modifier is one or more of PAC, $Al_2(SO_4)_3$, $Fe_2(SO_4)_3$, $AlCl_3$ and $FeCl_3$; the kaolin is 200-400 mesh in particle size.

Kaolin has a special lamellar and porous structure. Because a large specific surface area is conferred on the 200-400 mesh kaolin used in the present disclosure, either organic or inorganic modifier can expose to kaolin microscopically, helping the organic/inorganic modifier adsorb and bind to kaolin during subsequent hydrothermal reaction. During the hydrothermal reaction, organic modifier OTAC binds to the kaolin through an electrostatic attraction; a given amount of OTAC can convert negative charges into positive charges on the surface of the kaolin, and a long molecule thereof further increases the effective collision of the resulting material with harmful algae; the inorganic modifier selected not only produces cations by hydrolysis, but also form a colloid to further increase the adsorption of bloom algae; during the hydrothermal reaction, because of negative charges on the surface of the kaolin, the inorganic modifier with positive charges binds to the kaolin through an electrostatic attraction, while the inorganic modifier can insert metal ions into a kaolin structure through ion exchange with the kaolin. The water purifying material prepared by the present invention has a large specific surface area, with enhanced electropositivity; in general, algal cells in the waterbody are negatively charged on the surface and coagulate together with the water purifying material to form flocs through electrostatic adsorption; algal flocs per se not only settle into the water body due to gravity, but also net other algal cells together to sink into the water in the settling process; thus, the water purifying material is capable of removing algae effectively and is safe and eco-friendly.

In the method provided by the present disclosure, the organic and inorganic modifiers bind to kaolin firmly with stable properties because of electrostatic attraction and ion exchange reaction.

In addition, the present disclosure uses kaolin as a raw material, which is resourceful, cheap, innoxious, pollution-free, simply available and controllable, suitable for mass production, and is of high economic benefit; the present disclosure not only provides direction for the preparation of environmentally friendly water purifying materials, but also provides a new idea for efficient and high-value use of kaolin.

DETAILED DESCRIPTION

Figure 1:
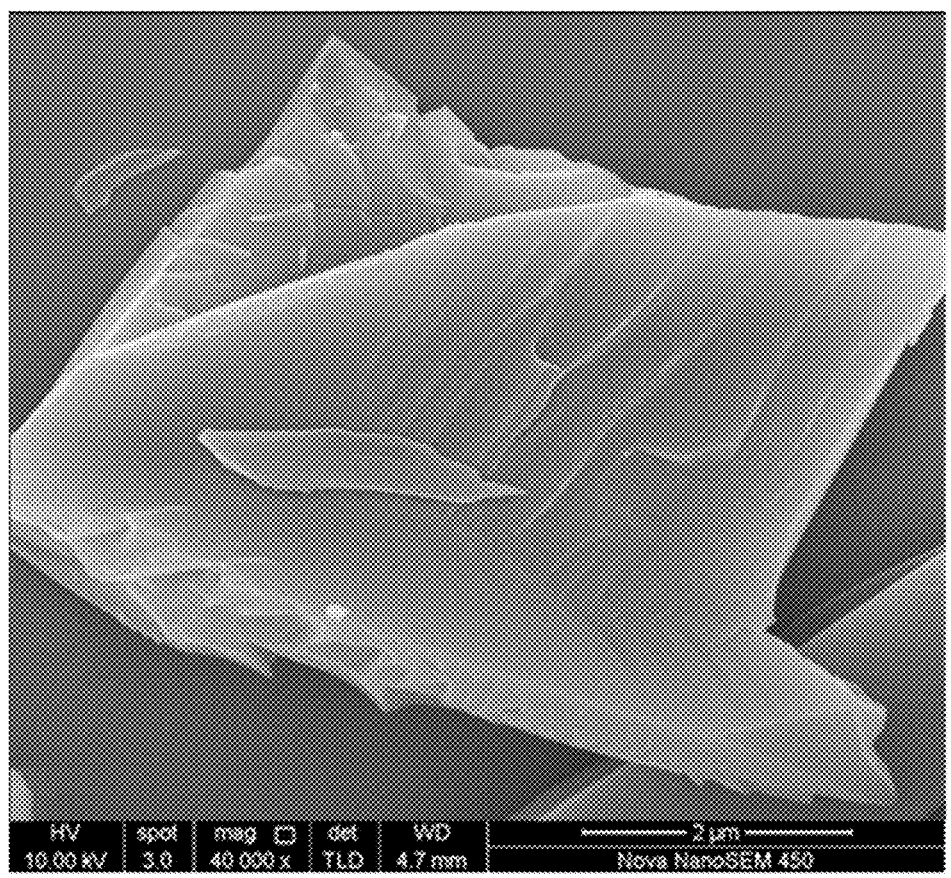
FIG. 1 is a scanning electron micrograph (SEM) of unmodified kaolin.

The present disclosure provides a method for preparing a kaolin-based water purifying material, including the following steps: mixing kaolin and a modifier with water, and conducting hydrothermal reaction to obtain a kaolin-based water purifying material;

The modifier is an organic or inorganic modifier; the organic modifier is OTAC, and the inorganic modifier is one or more of PAC, $Al_2(SO_4)_3$, $Fe_2(SO_4)_3$, $AlCl_3$, and $FeCl_3$;

The kaolin is 200-400 mesh in particle size.

In the present invention, unless otherwise specified, all raw materials used are commercially available products well known to those skilled in the art.

In the present disclosure, the kaolin and the modifier are mixed with water to obtain a mixture.

In the present disclosure, the kaolin may be 200-400 mesh, and preferably 250-350 mesh, in particle size. In the present disclosure, when the particle size of the kaolin does not meet the foregoing requirement, the present disclosure may preferably pulverize and sieve the kaolin to obtain kaolin with a particle size of 200-400 mesh. The 200-400 mesh kaolin used in the present disclosure has a large specific surface area and abundant pore structure, and contributes to reactions such as ion exchange with a modifier and adsorption during subsequent hydrothermal reaction; the water purifying material prepared after the reaction has strong adsorbability and ion exchange, which contributes to the removal of substances such as algae from the waterbody and thus water purification.

In the present disclosure, the modifier may be an organic or inorganic modifier; the organic modifier may be OTAC, and the inorganic modifier may be one or more of PAC, $Al_2(SO_4)_3$, $Fe_2(SO_4)_3$, $AlCl_3$ and $FeCl_3$. When the inorganic modifier is more of the foregoing substances, the present disclosure has no particular requirement on the ratio of each substance, as long as the ratio may be arbitrary. In an embodiment of the present disclosure, when the inorganic modifier is PAC and $FeCl_3$, the PAC and the $FeCl_3$ may have a mass ratio of 1:1.

In the present disclosure, the water may preferably be distilled water or ultrapure water.

In the present disclosure, the modifier and the kaolin may preferably have a mass ratio of 1:(10-25), more preferably 1:(12-22), and further preferably 1:(15-20).

In the present disclosure, the kaolin and the water may preferably have a solid-liquid ratio of 1 g:(2-5) mL, and more preferably 1 g:(3-4) mL.

The present disclosure has no particular requirement on the mixing method, as long as any method capable of mixing the kaolin and modifier with water well may be used. In the embodiments of the present disclosure, specifically, the kaolin and the modifier are mixed in a reactor and stirred well with water to obtain a mixture.

After the mixture is obtained, the present disclosure conducts hydrothermal reaction on the mixture.

In the present disclosure, the mixture is preferably placed in a reactor, and the reactor may be placed in a high-temperature furnace for hydrothermal reaction.

In the present disclosure, the hydrothermal reaction may preferably be conducted at 300-600° C., more preferably 350-550° C., and further preferably 400-500° C.; the hydrothermal reaction may preferably last for 4-8 h, more preferably 5-7 h, and further preferably 5.5-6.5 h.

When the modifier is an organic modifier, during the hydrothermal reaction of the present disclosure, positively charged organic modifier OTAC may bind to negatively charged kaolin through an electrostatic attraction; a given amount of OTAC may convert negative charges into positive charges on the surface of the kaolin, and a long molecule thereof may further increase the effective collision of the resulting material with harmful algae and enhance the purifying effect.

When the modifier is an inorganic modifier, during the hydrothermal reaction of the present disclosure, because of negative charges on the surface of the kaolin, the inorganic modifier with positive charges binds to the kaolin through an electrostatic attraction, while the inorganic modifier can insert metal ions into a kaolin structure through ion exchange with the kaolin, increasing the spatial complexity of the layered structure of the kaolin and thereby contributing to the adhesion and precipitation of algal substances. In addition, the inorganic modifier selected by the present disclosure may further hydrolyze to form a colloid and have adsorption and flocculating effects.

After the hydrothermal reaction is completed, the present disclosure preferably cools products of the hydrothermal reaction to room temperature naturally, followed by washing and drying successively.

In the present disclosure, when the modifier is an organic modifier, absolute ethanol and water may be used in the washing successively; the washing with absolute ethanol may preferably be conducted twice to thrice, and the washing with water preferably be conducted twice to thrice. The water may preferably be ultrapure water. The present disclosure uses absolute ethanol to wash off organic substances adhered to the surface of the material and uses ultrapure water to wash to ensure that the resulting material is free of impurities.

In the present disclosure, when the modifier is an inorganic modifier, the water, and more preferably ultrapure water, may be used as washing liquid in the washing. The present disclosure has no particular requirement on washing process, as long as a washing process well known in the art may be used.

In the present disclosure, the drying may preferably be conducted under vacuum, so as to avoid air from exposing to and reacting with the kaolin-based water purifying material to influence product quality.

In the present disclosure, the drying may preferably last for 6-8 h, and more preferably 6.5-7.5 h. In the present disclosure, when the modifier is an organic modifier, the drying may preferably be conducted at a temperature of 75-85° C., and more preferably 80° C.; when the modifier is an inorganic modifier, the drying may preferably be conducted at a temperature of 100-110° C., and more preferably 105° C.

After drying, the present disclosure preferably seals and stores the kaolin-based water purifying material prepared for use.

The present disclosure provides a kaolin-based water purifying material prepared by the preparation method according to the above solutions. The water purifying material of the present invention has a large specific surface area, with enhanced electropositivity; in general, algal cells in the water body are negatively charged on the surface and coagulate together with the water purifying material to form flocs through electrostatic adsorption; algal flocs per se not only settle into the water body due to gravity, but also net other algal cells together to sink into the water in the settling process; thus, the water purifying material is capable of removing algae effectively and is safe and eco-friendly.

The present disclosure provides use of the kaolin-based water purifying material according to the above solutions in the treatment of wastewater with harmful algal blooms. The present disclosure has no particular requirement on sources of the wastewater with harmful algal blooms, as long as the wastewater with harmful algal blooms may be well known in the art.

The present disclosure has no particular requirement on the implementation of the use, as long as the implementation of the use may be well known in the art. In the embodiments of the present disclosure, specifically, the kaolin-based water purifying material is directly added into wastewater with algal blooms for stirring. In the present disclosure, the amount of the kaolin-based water purifying material may preferably be 15-60 mg/L, and more preferably 30-60 mg/L.

The kaolin-based water purifying material and the preparation method and use thereof provided by the present invention will be described in detail below in conjunction with embodiments, but should not be construed as limiting the scope of the present disclosure.

Embodiment 1

The embodiment provided a method for preparing a kaolin-based water purifying material, specifically including the following steps:

1) 10 g of kaolin was pulverized by a pulverizer and sieved through a 400 mesh sieve to obtain 400 mesh kaolin. FIG. 1 showed a scanning electron micrograph thereof.

2) 50 mg of OTAC was mixed well with 1 g of the foregoing 400 mesh kaolin (the OTAC and the kaolin had a mass ratio of 1:20); the resulting mixture was transferred into a reactor, mixed with 30 mL of distilled water, and sealed; the reactor was placed in a high-temperature furnace, heated up to 350° C., held for 5 h for hydrothermal reaction, cooled, and taken out. The resulting mixture was washed thrice with absolute ethanol and fully washed with ultrapure water. Finally, the resulting mixture was vacuum dried at 80° C., and a final product was collected, sealed, and stored for use.

Figure 2:
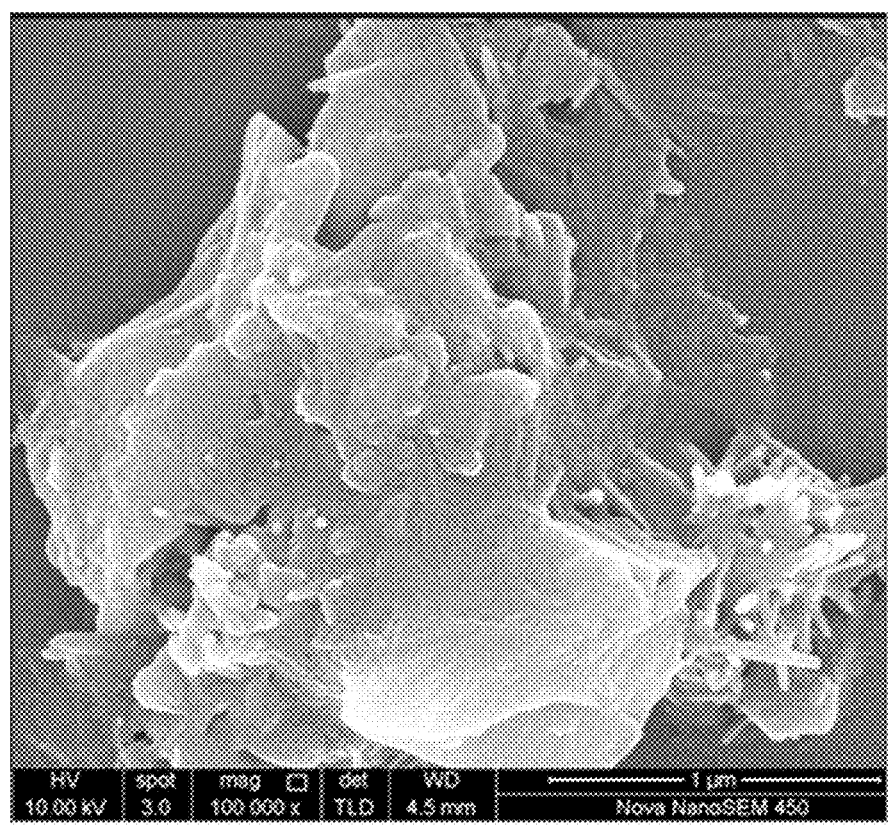
FIG. 2 is a scanning electron micrograph of an OTAC-modified water purifying material in Embodiment 1.

FIG. 2 illustrated an OTAC-modified water purifying material in Embodiment 1; from FIG. 2, the smooth surface of the resulting water purifying material became rough, and a plurality of long "antenniform" substances appeared; surface pores and specific surface area increased.

Embodiment 2

The embodiment provided a method for preparing a kaolin-based water purifying material, specifically including the following steps: 1) 10 g of kaolin was pulverized by a pulverizer and sieved through a 400 mesh sieve to obtain 400 mesh kaolin.

2) 66.7 mg of PAC was mixed well with 1 g of the foregoing 400 mesh kaolin (the PAC and the kaolin had a mass ratio of 1:15); the resulting mixture was transferred into a reactor, mixed with 30 mL of distilled water, and sealed; the reactor was placed in a high-temperature furnace, heated up to 400° C., held for 5 h for hydrothermal reaction, cooled, and taken out. The resulting mixture was washed thrice with ultrapure water. Finally, the resulting mixture was vacuum dried at 105° C., and a final product was collected, sealed, and stored for use.

Figure 6:
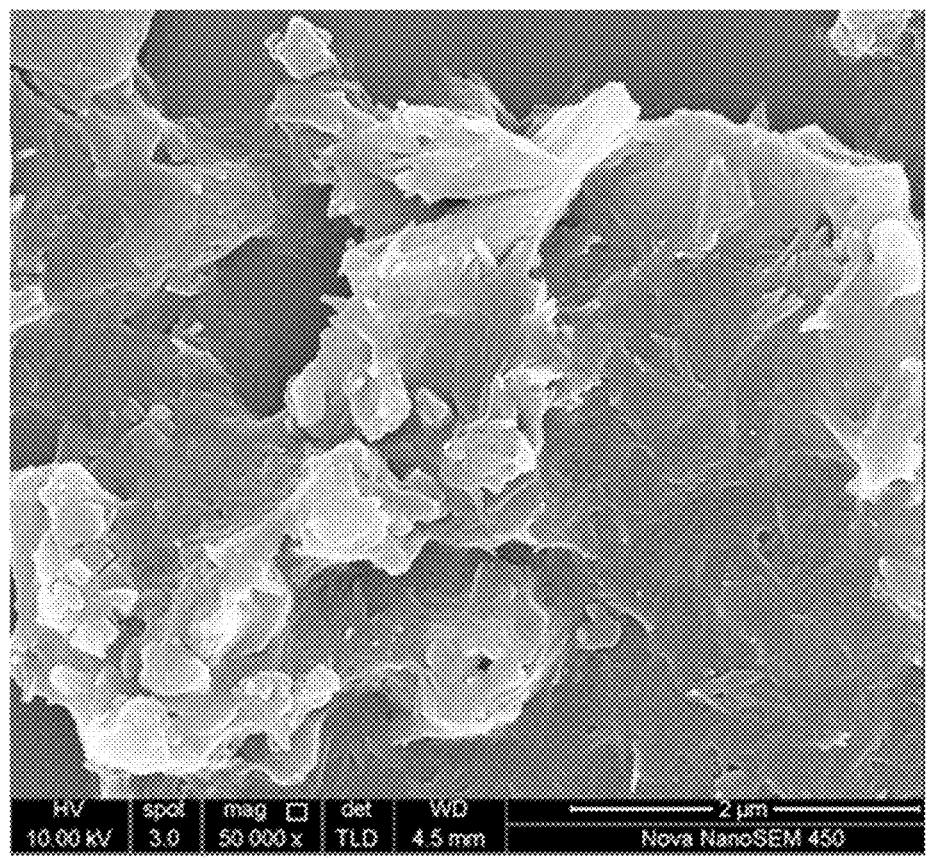
FIG. 6 is a scanning electron micrograph of a PAC-modified water purifying material in Embodiment 2.

FIG. 6 illustrated a PAC-modified water purifying material in Embodiment 2; from FIG. 6, the surface of the resulting water purifying material became rough, and there were long "antenniform" substances; specific surface area increased.

Embodiment 3

The embodiment provided a method for preparing a kaolin-based water purifying material, specifically including the following steps:

1) 10 g of kaolin was pulverized by a pulverizer and sieved through a 400 mesh sieve to obtain 400 mesh kaolin.

2) 55.56 mg of $Al_2(SO_4)_3$ was mixed well with 1 g of the foregoing 400 mesh kaolin (the $Al_2(SO_4)_3$ and the kaolin had a mass ratio of 1:18); the resulting mixture was transferred into a reactor, mixed with 30 mL of distilled water, and sealed; the reactor was placed in a high-temperature furnace, heated up to 550° C., held for 6 h for hydrothermal reaction, cooled, and taken out. The resulting mixture was washed thrice with ultrapure water. Finally, the resulting mixture was vacuum dried at 105° C., and a final product was collected, sealed and stored for use.

Figure 5:
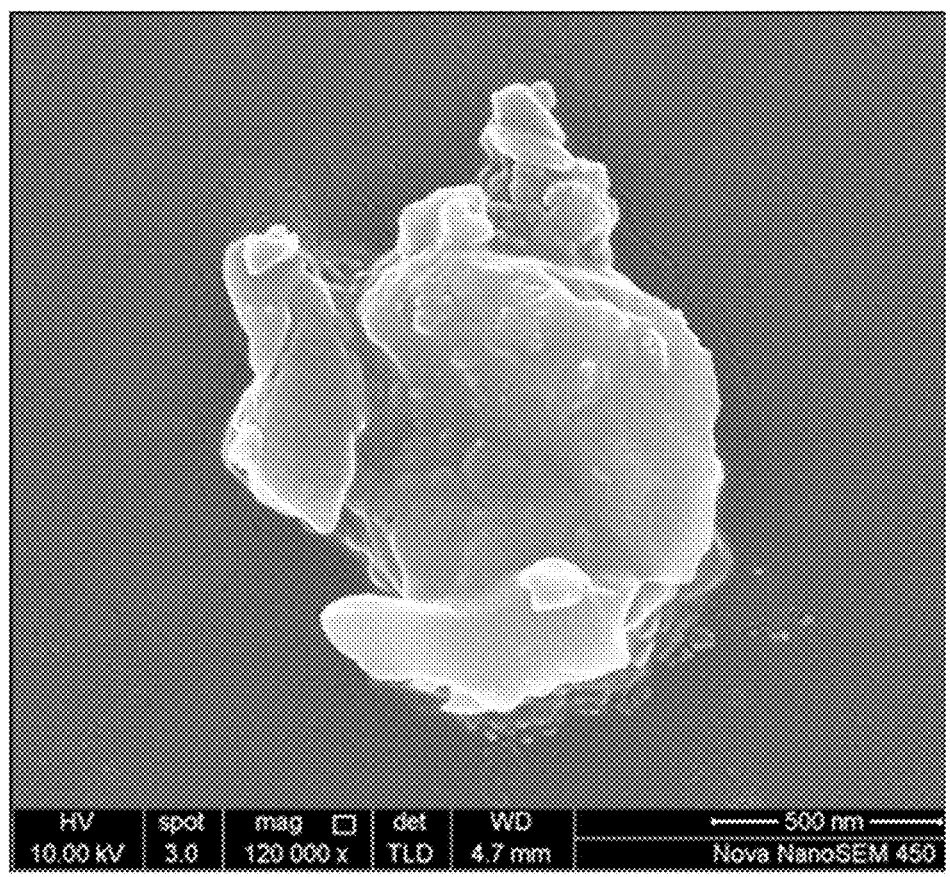
FIG. 5 is a scanning electron micrograph of an $Al_2(SO_4)_3$-modified water purifying material in Embodiment 3.

FIG. 5 illustrated an $Al_2(SO_4)_3$-modified water purifying material in Embodiment 3; from FIG. 5, the surface of the resulting water purifying material became rough due to adhesion or intercalation of $Al_2(SO_4)_3$; specific surface area increases.

Embodiment 4

1) 10 g of kaolin was pulverized by a pulverizer and sieved through a 400 mesh sieve to obtain 400 mesh kaolin.

2) 55.55 mg of $Fe_2(SO_4)_3$ was mixed well with 1 g of the foregoing 400 mesh kaolin (the $Fe_2(SO_4)_3$ and the kaolin had a mass ratio of 1:18); the resulting mixture was transferred into a reactor, mixed with 30 mL of distilled water, and sealed; the reactor was placed in a high-temperature furnace, heated up to 550° C., held for 6 h for hydrothermal reaction, cooled and taken out. The resulting mixture was washed thrice with ultrapure water. Finally, the resulting mixture was vacuum dried at 105° C., and a final product was collected, sealed and stored for use.

Figure 4:
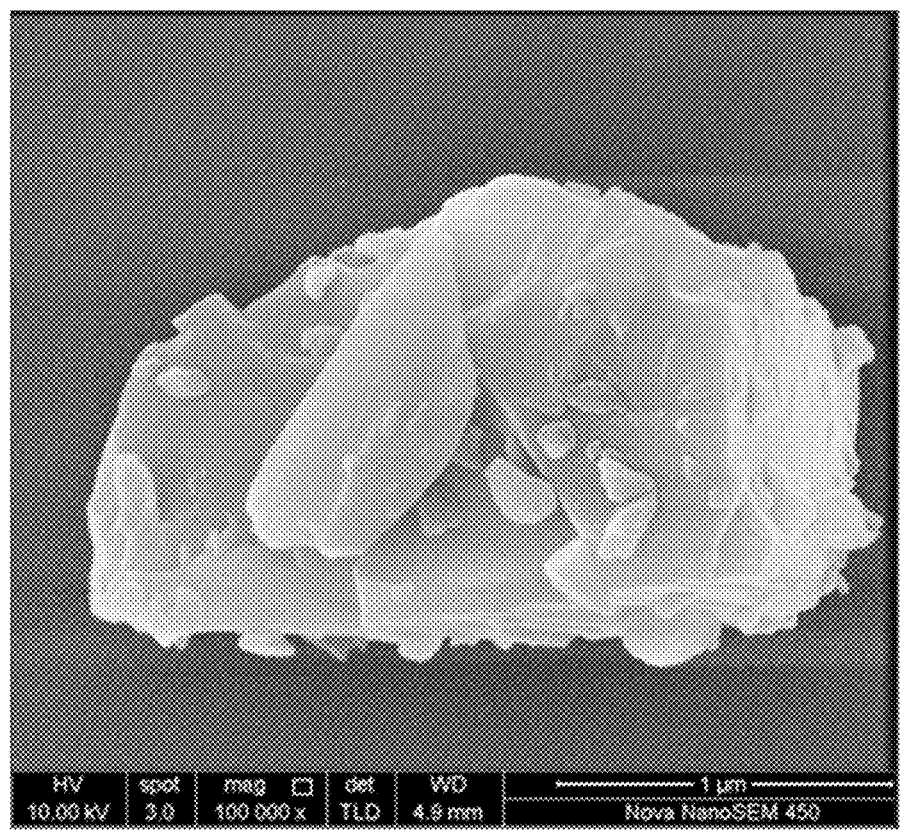
FIG. 4 is a scanning electron micrograph of an $Fe_2(SO_4)_3$-modified water purifying material in Embodiment 4.

FIG. 4 illustrated an $Fe_2(SO_4)_3$-modified water purifying material in Embodiment 4; from FIG. 4, the surface of the resulting water purifying material was rough; specific surface area increased.

Embodiment 5

1) 10 g of kaolin was pulverized by a pulverizer and sieved through a 400 mesh sieve to obtain 400 mesh kaolin.

2) 83.33 mg of $AlCl_3$ was mixed well with 1 g of the foregoing 400 mesh kaolin (the $AlCl_3$ and the kaolin had a mass ratio of 1:12); the resulting mixture was transferred into a reactor, mixed with 30 mL of distilled water, and sealed; the reactor was placed in a high-temperature furnace, heated up to 600° C., held for 7 h for hydrothermal reaction, cooled, and taken out. The resulting mixture was washed thrice with ultrapure water. Finally, the resulting mixture was vacuum dried at 105° C., and a final product was collected, sealed, and stored for use.

Figure 3:
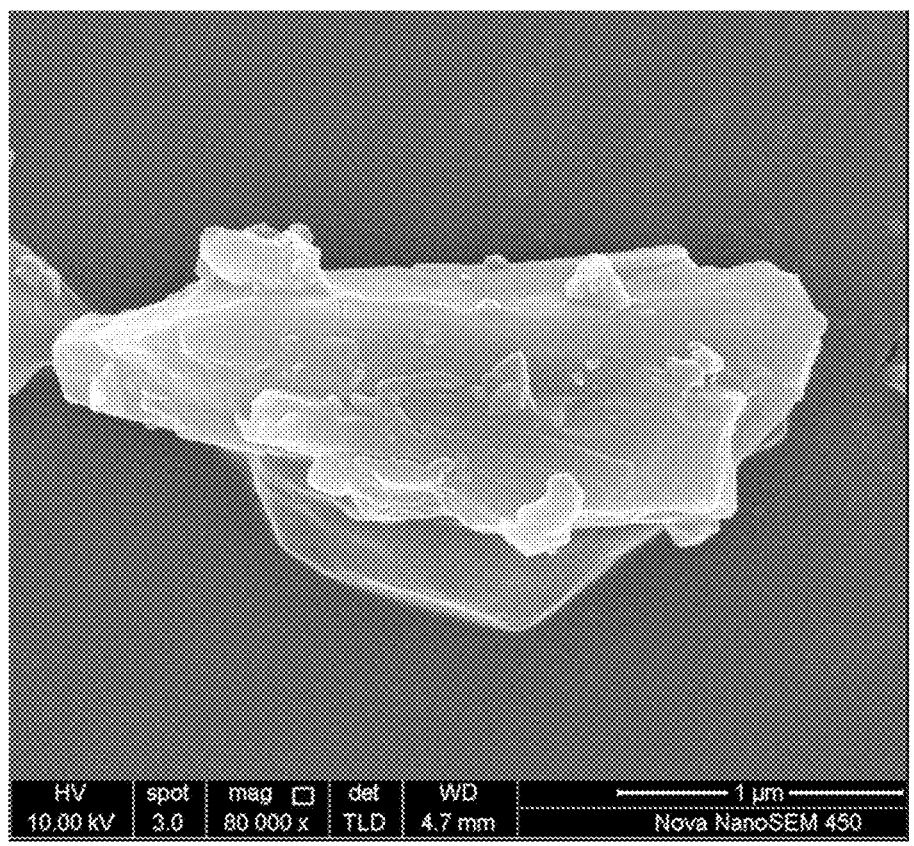
FIG. 3 is a scanning electron micrograph of an $AlCl_3$-modified water purifying material in Embodiment 5.

FIG. 3 illustrated an $AlCl_3$-modified water purifying material in Embodiment 5; from FIG. 3, pores increased on the surface of the resulting water purifying material; specific surface area increased Embodiment 6

1) 10 g of kaolin was pulverized by a pulverizer and sieved through a 400 mesh sieve to obtain 400 mesh kaolin.

2) 83.33 mg of $FeCl_3$ was mixed well with 1 g of the foregoing 400 mesh kaolin (the $FeCl_3$ and the kaolin had a mass ratio of 1:12); the resulting mixture was transferred into a reactor, mixed with 30 mL of distilled water, and sealed; the reactor was placed in a high-temperature furnace, heated up to 600° C., held for 7 h for hydrothermal reaction, cooled, and taken out. The resulting mixture was washed thrice with ultrapure water. Finally, the resulting mixture was vacuum dried at 105° C., and a final product was collected, sealed, and stored for use.

Figure 8:
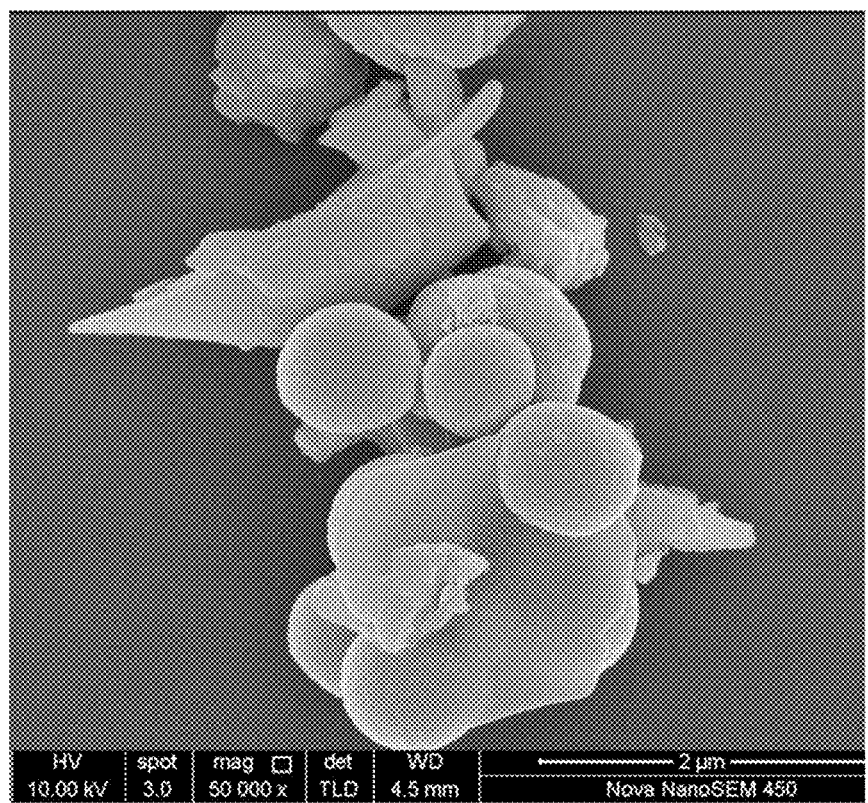
FIG. 8 is a scanning electron micrograph of an $FeCl_3$-modified water purifying material in Embodiment 6.

FIG. 8 illustrated an $FeCl_3$-modified water purifying material in Embodiment 6; from FIG. 8, the surface of the resulting water purifying material became rough; specific surface area increased.

Embodiment 7

1) 10 g of kaolin was pulverized by a pulverizer and sieved through a 400 mesh sieve to obtain 400 mesh kaolin.

2) 50 mg of PAC and 50 mg of $FeCl_3$ was mixed well with 1 g of the foregoing 400 mesh kaolin (the PAC, the $FeCl_3$ and the kaolin had a mass ratio of 1:1:20); the resulting mixture was transferred into a reactor, mixed with 30 mL of distilled water, and sealed; the reactor was placed in a high-temperature furnace, heated up to 600° C., held for 8 h for hydrothermal reaction, cooled and taken out. The resulting mixture was washed thrice with ultrapure water. Finally, the resulting mixture was vacuum dried at 105° C., and a final product was collected, sealed, and stored for use.

Figure 7:
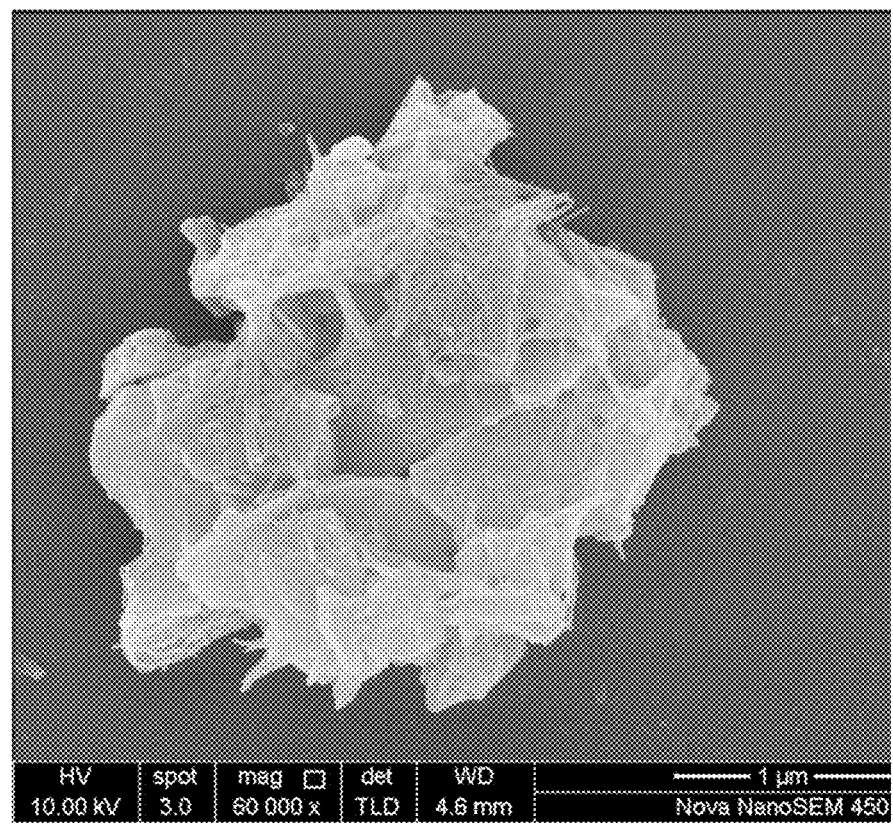
FIG. 7 is a scanning electron micrograph of a PAC/$FeCl_3$-modified water purifying material in Embodiment 7.

FIG. 7 illustrated a PAC/$FeCl_3$-modified water purifying material in Embodiment 7; from FIG. 7, pores increased on the surface of the resulting water purifying material, and some "antenniform" substances appeared; specific surface area increased.

Application Example 1

40 mg of the kaolin-based water purifying material obtained in Embodiment 1 was poured into 1 L of a water sample of algae bloom collected from Qingshan Lake, Nanchang, Jiangxi Province; hydraulic conditions were simulated; the water sample was stirred rapidly (250 r/min) for 3 min and slowly (50 r/min) for 10 min; finally, the water sample was let stand for a certain period of time, and a sample was collected 3 cm below the liquid level to test chlorophyll a and turbidity. Test results were shown in Table 1.

Application Example 2

50 mg of the kaolin-based water purifying material obtained in Embodiment 2 was poured into 1 L of a water sample of algae bloom collected from Qingshan Lake, Nanchang, Jiangxi Province; hydraulic conditions were simulated; the water sample was stirred rapidly (250 r/min) for 3 min and slowly (50 r/min) for 10 min; finally, the water sample was let stand for a certain period of time, and a sample was collected 3 cm below the liquid level to test chlorophyll a and turbidity. Test results were shown in Table 2.

Application Example 3

30 mg of the kaolin-based water purifying material obtained in Embodiment 7 was poured into 1 L of a water sample of algae bloom collected from Qingshan Lake, Nanchang, Jiangxi Province; hydraulic conditions were simulated; the water sample was stirred rapidly (250 r/min) for 3 min and slowly (50 r/min) for 10 min; finally, the water sample was let stand for a certain period of time, and a sample was collected 3 cm below the liquid level to test chlorophyll a and turbidity. Test results were shown in Table 3.

Application Example 4

15 mg each of the kaolin-based water purifying materials obtained in Embodiments 1 to 6 were poured into six aliquots of 1 L of water sample of algae bloom collected from Qingshan Lake, Nanchang, Jiangxi Province, respectively; the initial chlorophyll a content was 1,916.12 μg/L and the turbidity was 154 NTU for the water sample of algae bloom. Hydraulic conditions were simulated; each water sample was stirred rapidly (250 r/min) for 3 min and slowly (50 r/min) for 10 min; finally, each water sample was let stand for 30 min, and a sample was collected 3 cm below the liquid level to test chlorophyll a and turbidity. Test results were shown in Table 4.

TABLE 1

| Test results of Application Example 1 | | | | |
| --- | --- | --- | --- | --- |
| Reaction time (min) | 0 | 10 | 30 | 60 |
| Chlorophyll a (μg/L) | 1,841.4 | 125.55 | 75.33 | 58.59 |
| Removal rate of chlorophyll a (%) | 0 | 93.20 | 95.91 | 96.80 |

TABLE 1-continued

Test results of Application Example 1

| Reaction time (min) | 0 | 10 | 30 | 60 |
|---|---|---|---|---|
| Turbidity (NTU) | 100 | 26.00 | 9.94 | 9.04 |
| Turbidity removal rate (%) | 0 | 74.00 | 90.06 | 90.96 |

TABLE 2

Test results of Application Example 2

| Reaction time (min) | 0 | 10 | 30 | 60 |
|---|---|---|---|---|
| Chlorophyll a (µg/L) | 1,079.73 | 108.81 | 100.44 | 38.37 |
| Removal rate of chlorophyll a (%) | 0 | 89.9 | 90.7 | 96.45 |
| Turbidity (NTU) | 156.00 | 23.43 | 20.83 | 17.77 |
| Turbidity removal rate (%) | 0 | 84.98 | 86.65 | 88.61 |

TABLE 3

Test results of Application Example 3

| Reaction time (min) | 0 | 10 | 30 | 60 |
|---|---|---|---|---|
| Chlorophyll a (µg/L) | 1,740.96 | 133.92 | 100.44 | 83.7 |
| Removal rate of chlorophyll a (%) | 0 | 92.30 | 94.20 | 95.19 |
| Turbidity (NTU) | 156.00 | 26.07 | 23.43 | 20.83 |
| Turbidity removal rate (%) | 0 | 83.29 | 84.98 | 86.65 |

TABLE 4

Test results of Application Example 4

| | Type of modifier | Turbidity (NTU) | Turbidity removal rate (%) | Chlorophyll a (µg/L) | Removal rate of chlorophyll a (%) |
|---|---|---|---|---|---|
| Embodiment 1 | OTAC | 13.16 | 91.45 | 75.33 | 96.07 |
| Embodiment 2 | PAC | 14.63 | 90.50 | 76.25 | 96.02 |
| Embodiment 3 | $Al_2(SO_4)_3$ | 15.33 | 90.05 | 77.21 | 95.97 |
| Embodiment 4 | $Fe_2(SO_4)_3$ | 14.98 | 90.27 | 76.03 | 96.03 |
| Embodiment 5 | $AlCl_3$ | 16.01 | 89.60 | 77.90 | 95.93 |
| Embodiment 6 | $FeCl_3$ | 15.87 | 89.69 | 76.98 | 95.98 |

From the above embodiments and application examples, by means of different types of modifiers, the present disclosure can successfully prepare a plurality of kaolin-based water purifying materials. Kaolin-based water purifying materials in different ratios can be obtained by regulating the amount of the modifier(s); moreover, the water purifying materials prepared by the present disclosure have large specific surface areas and increase positive charges, which are used in purifying algae blooms in the water body and have excellent purifying effects.

The foregoing descriptions are merely preferred embodiments of the present disclosure; it should be noted that several improvements and modifications can also be made by those of ordinary skill in the art without departing from the principles of the present disclosure, and these improvements and modifications should also be regarded as the protection scope of the present disclosure.

What is claimed is:

1. A method for preparing a kaolin-based water purifying material, comprising the following steps: mixing kaolin and a modifier with water, and conducting hydrothermal reaction to obtain a kaolin-based water purifying material;
    wherein the modifier is an inorganic modifier; the inorganic modifier is one or more of polyaluminum chloride, $Al_2(SO_4)_3$, $Fe_2(SO_4)_3$, $AlCl_3$ and $FeCl_3$; and
    the kaolin is 200-400 mesh in particle size.

2. The method according to claim 1, wherein the modifier and the kaolin have a mass ratio of 1:(10-25).

3. The method according to claim 1, wherein the kaolin and the water have a solid-liquid ratio of 1 g:(2-5) mL.

4. The method according to claim 1, wherein the hydrothermal reaction is conducted at a temperature of 300-600° C.

5. The method according to claim 4, wherein the hydrothermal reaction lasts for 4-8 h.

6. The method according to claim 1, wherein the hydrothermal reaction is completed, followed by washing and drying products of the hydrothermal reaction successively.

7. The method according to claim 6, wherein
    the water is used as washing liquid in the washing.

8. The method according to claim 6, wherein the drying is conducted under vacuum; the drying lasts for 6-8 h; and
    wherein the drying is conducted at a temperature of 100-110° C.

* * * * *